United States Patent
Tetelbaum

(10) Patent No.: US 8,645,888 B2
(45) Date of Patent: Feb. 4, 2014

(54) CIRCUIT TIMING ANALYSIS INCORPORATING THE EFFECTS OF TEMPERATURE INVERSION

(75) Inventor: Alexander Tetelbaum, Hayward, CA (US)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 13/453,289

(22) Filed: Apr. 23, 2012

(65) Prior Publication Data

US 2012/0210287 A1 Aug. 16, 2012

Related U.S. Application Data

(62) Division of application No. 12/251,088, filed on Oct. 14, 2008, now Pat. No. 8,181,144.

(51) Int. Cl.
*G06F 17/50* (2006.01)

(52) U.S. Cl.
USPC ............ 716/113; 716/110; 716/132; 716/134

(58) Field of Classification Search
USPC .................................. 716/113, 132, 134, 110
See application file for complete search history.

(56) References Cited

U.S. PATENT DOCUMENTS

| | | | | |
|---|---|---|---|---|
| 5,802,349 A * | 9/1998 | Rigg et al. | ..................... | 716/103 |
| 6,090,152 A * | 7/2000 | Hayes et al. | .................. | 716/113 |
| 6,609,238 B1 | 8/2003 | Tetelbaum | | |
| 7,092,838 B1 * | 8/2006 | Srinivas et al. | ............... | 702/117 |
| 7,391,272 B2 * | 6/2008 | Fujita et al. | .................. | 331/36 C |
| 7,464,355 B2 * | 12/2008 | Yoshimura | .................... | 716/113 |
| 7,500,206 B2 * | 3/2009 | Yamamoto et al. | ........... | 716/108 |
| 7,661,079 B2 * | 2/2010 | Ogawa | .......................... | 716/100 |
| 7,669,154 B2 * | 2/2010 | Hosono | ........................ | 716/135 |
| 7,795,939 B2 * | 9/2010 | Chen et al. | ..................... | 327/199 |
| 7,882,471 B1 * | 2/2011 | Kariat et al. | .................. | 716/113 |
| 2002/0174409 A1 * | 11/2002 | Cohn et al. | ........................ | 716/6 |
| 2003/0102511 A1 * | 6/2003 | Kuge | ............................. | 257/369 |
| 2004/0025136 A1 | 2/2004 | Carelli | | |
| 2007/0006106 A1 | 1/2007 | Bartling et al. | | |
| 2007/0050092 A1 | 3/2007 | Kenyon et al. | | |
| 2007/0226660 A1 * | 9/2007 | Ogawa | ............................. | 716/2 |
| 2007/0234254 A1 * | 10/2007 | Yoshimura | ........................ | 716/6 |

(Continued)

OTHER PUBLICATIONS

A. Dasdan et al., "Handling Inverted Temperature Dependence in Static Timing Analysis," ACM Transactions on Design Automation of Electronic Systems, Apr. 2006, pp. 306-324, vol. 11, No. 2.

(Continued)

*Primary Examiner* — Stacy Whitmore
(74) *Attorney, Agent, or Firm* — Otterstedt, Ellenbogen & Kammer, LLP

(57) ABSTRACT

Methods and apparatus for increasing the accuracy of timing characterization of a circuit including at least one cell in a cell library are provided. One method includes the steps of: performing cell library timing characterization for the cell for prescribed first and second temperatures, the first and second temperatures corresponding to minimum and maximum temperatures of operation of the circuit, respectively; selecting one or more additional temperatures between the first and second temperatures; performing cell timing characterization for each process, voltage and temperature (PVT) corner at the one or more additional temperatures, as well as at the first and second temperatures; and performing timing sign-off for each PVT corner using the one or more additional temperatures, the timing sign-off being based at least in part on the timing characterization for each PVT corner.

8 Claims, 5 Drawing Sheets

(56) References Cited

U.S. PATENT DOCUMENTS

| | | |
|---|---|---|
| 2009/0077514 A1* | 3/2009 | Malek-Khosravi et al. ...... 716/6 |
| 2009/0217226 A1* | 8/2009 | Cui et al. .......................... 716/6 |
| 2010/0095260 A1* | 4/2010 | Tetelbaum ........................ 716/6 |
| 2010/0188060 A1* | 7/2010 | Malek-Khosravi et al. .. 323/234 |
| 2011/0126163 A1* | 5/2011 | Habitz et al. ................. 716/108 |
| 2011/0138347 A1* | 6/2011 | Tetelbaum .................... 716/133 |

OTHER PUBLICATIONS

A. Tetelbaum et al., "Impact of Temperature Inversion on Timing Sign-off and Design Methodology," Presented at Microprocessor Test and Verification Workshop, Dec. 2007, pp. 1-7.

\* cited by examiner

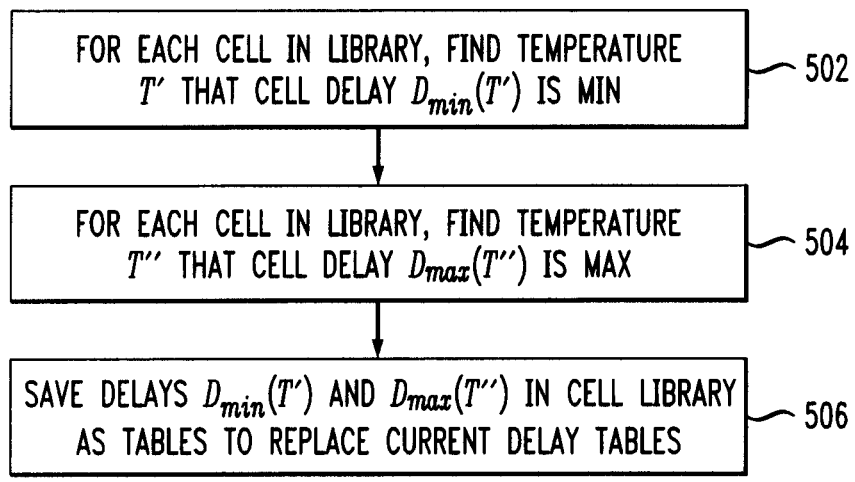
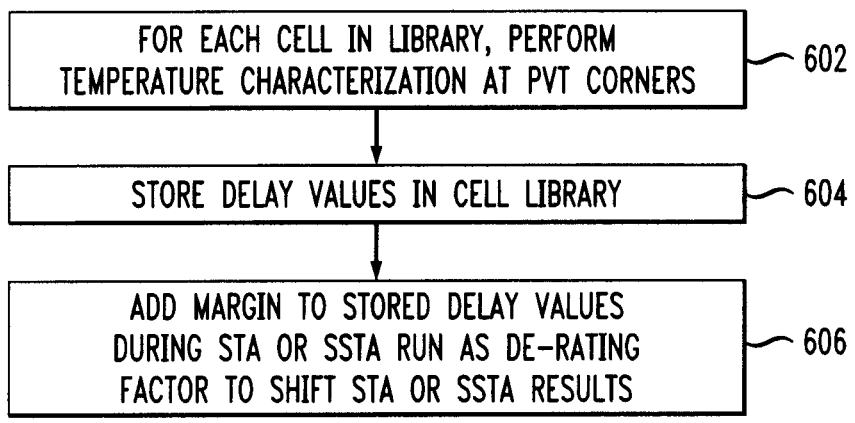

700

800

900

CIRCUIT TIMING ANALYSIS INCORPORATING THE EFFECTS OF TEMPERATURE INVERSION

CROSS-REFERENCE TO RELATED APPLICATION(S)

This application is a divisional of U.S. application Ser. No. 12/251,088, filed on Oct. 14, 2008, now issued as U.S. Pat. No. 8,181,144, the disclosure of which is incorporated herein by reference in its entirety for all purposes. Application Ser. No. 12/251,088 is related to a commonly assigned U.S. application Ser. No. 12/251,110, now issued as U.S. Pat. No. 8,225,257, filed concurrently therewith, the disclosure of which is incorporated by reference herein in its entirety for all purposes.

FIELD OF THE INVENTION

The present invention relates generally to the electrical, electronic, and computer arts, and more particularly relates to circuit timing analysis and design.

BACKGROUND OF THE INVENTION

Many challenges affect the ability to accurately predict the performance of circuit designs, particularly as integrated circuit (IC) fabrication process technologies migrate into sub-100 nanometer (nm) regions. Such challenges include, for example, circuit complexity, process variability and uncertainty, modeling uncertainty, variability in assumptions utilized in electronic design automation (EDA) tools, etc. In order to compensate for these uncertainties, changes that have been made to timing sign-off include signing off at specified minimum and maximum temperature corners and adding an extra margin onto the design. However, newer modeling obstacles, with varying degrees of influence, are becoming critical in achieving silicon accuracy in both analysis and implementation.

Using conventional circuit static timing analysis (STA) tools, it is assumed that circuit delay paths are fastest or slowest at specified minimum or maximum temperature corners. Traditionally, cell delay increases with rising temperature. But in sub-100 nm process designs, measurement has shown that cell delays can decrease with rising temperature. This behavior is often referred to as temperature inversion. Temperature inversion is dependent on various factors, including, for example, IC process parameters, circuit type, cell load, and supply voltage. At sub-100 nm, it has been observed that the extent of temperature dependency can vary differently with each type of cell and its load in the circuit, and such temperature dependency need not be uniform for all cells.

Conventional modeling and analysis tools have proved to be inadequate in terms of predicting circuit behavior for sub-100 nm process designs. Accordingly, there exists a need for techniques for improving the accuracy of circuit timing characterization that do not suffer from one or more of the above-described problems associated with conventional timing characterization methodologies.

SUMMARY OF THE INVENTION

Illustrative embodiments of the present invention meet the above-noted need by providing techniques for improving the accuracy of circuit timing characterization.

In accordance with one aspect of the invention, a method for increasing the accuracy of timing characterization of a circuit including one or more cells in a cell library is provided. The method includes the steps of: performing cell library timing characterization for each of the cells in the circuit for at least first and second prescribed temperatures, the first and second temperatures corresponding to first and second process, voltage and temperature (PVT) corners, respectively, in the cell library; calculating respective cell delays for the one or more cells in the circuit, the cell delay calculation being a function of temperature for each instance of the one or more cells; and incorporating the cell delay calculation into the timing characterization for each of the cells in the circuit to thereby increase the accuracy of the timing characterization.

In accordance with another embodiment of the invention, the method for increasing the accuracy of the timing characterization includes the steps of: performing cell library timing characterization for the cells in the circuit for first and second prescribed temperatures, the first and second temperatures corresponding to minimum and maximum temperatures of operation of the circuit, respectively; selecting one or more additional temperatures between the first and second temperatures; performing cell timing characterization for each PVT corner at the one or more additional temperatures, as well as at the first and second temperatures; and performing timing sign-off for each PVT corner using the one or more additional temperatures, the timing sign-off being based at least in part on the timing characterization for each PVT corner.

In accordance with yet another embodiment of the invention, a method for increasing the accuracy of the timing characterization of the circuit includes the steps of: for each cell in the circuit, determining a first temperature at which cell delay is minimum; for each cell in the circuit, determining a second temperature at which cell delay is maximum; storing the first temperature and a first cell delay value corresponding thereto, and storing the second temperature and a second cell delay value corresponding thereto, the first and second cell delay values being stored in the cell library as new tables replacing current delay tables used by a delay calculator in performing the timing characterization of the circuit.

In accordance with a fourth embodiment of the invention, a method for increasing the accuracy of the timing characterization of a circuit includes the steps of: for each cell in the circuit, performing cell library timing characterization for at least first and second prescribed temperatures, the first and second temperatures corresponding to at least first and second PVT corners in the cell library; calculating a cell delay for each cell in the circuit, the cell delay calculation being a function of temperature for each instance of the at least one cell; and adding a margin to the cell delay for each cell in the circuit, the cell library timing characterization being modified as a function of the margin corresponding to each cell in the circuit.

In accordance with a fifth embodiment of the invention, a method for increasing the accuracy of the timing characterization includes the steps of: determining all timing critical paths in the circuit; generating a set of circuit simulation functional parameters for all timing critical paths in the circuit; performing circuit simulation on each of the timing critical paths using the set of circuit simulation functional parameters by sweeping a temperature at which the circuit simulation is performed within a prescribed range of each PVT corner in the cell library, the circuit simulation generating respective path delays for each of the critical timing paths in the circuit; and determining timing margins to be used in increasing the accuracy of the timing characterization of the circuit.

Any one of the above methods, or any combination of one or more of the above methods, may be implemented in an apparatus (e.g., system, integrated circuit, circuit, etc.) including memory and at least one processor coupled to the memory. The processor is configured to implement steps according to one or more embodiments of the invention.

These and other features, aspects and advantages of the present invention will become apparent from the following detailed description of illustrative embodiments thereof, which is to be read in connection with the accompanying drawings.

BRIEF DESCRIPTION OF THE DRAWINGS

FIG. 5 is a flow diagram illustrating an exemplary method for improving the accuracy of circuit timing analysis, in accordance with another embodiment of the invention.

FIG. 6 is a flow diagram illustrating an exemplary method for improving the accuracy of circuit timing analysis, in accordance with yet another embodiment of the invention.

DETAILED DESCRIPTION OF THE INVENTION

Figure 1:
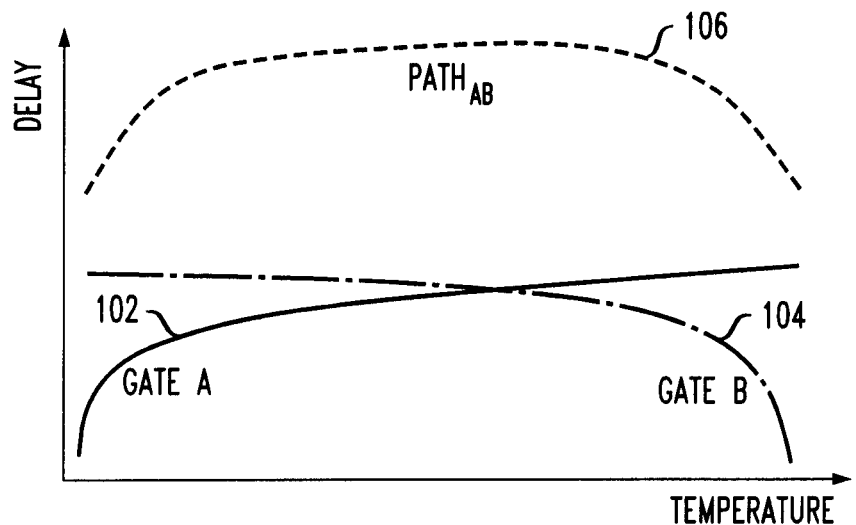
FIG. 1 illustrates a non-linear relationship between delay and temperature for an exemplary circuit including two logic gates.

The present invention will be described herein in the context of exemplary techniques for more accurately determining cell and/or path delay in a circuit. It is to be understood, however, that the techniques of the present invention are not limited to the methodologies shown and described herein. Rather, embodiments of the invention are directed to techniques for advantageously predicting timing behavior in a circuit taking into account temperature inversion effects. In this manner, a more accurate determination of cell and/or path delay in the circuit can be achieved. Although reference may be made herein to n-channel metal-oxide-semiconductor (NMOS) or p-channel metal-oxide-semiconductor (PMOS) transistor devices which may be formed using a complementary metal-oxide-semiconductor (CMOS) IC fabrication process, the invention is not limited to such devices and/or such an IC fabrication process.

Inverted temperature dependence (ITD), also referred to herein as temperature inversion, has drawn considerable attention recently as IC process technology continues scaling below 100 nm. The temperature inversion phenomenon typically occurs, or is at least more prevalent, when a circuit is operated at low supply voltage levels (e.g., about one volt or less). When the circuit is operated at low supply voltage, the propagation delay of a cell in the circuit may decrease as the temperature increases, which is contrary to an intuitive understanding that cell delay generally increases with increasing temperature. At high supply voltages, electron mobility largely determines drain current in a transistor device, but at low supply voltages, transistor device threshold voltage, Vth, is the dominant factor in determining drain current. Thus, delay increases or decreases with increasing temperature depending primarily on the magnitude of the supply voltage. A principal reason behind this reversed temperature dependence effect is due to the effect of temperature change on the threshold voltage.

More particularly, as supply voltage is scaled with the advance of the IC process technology, the value of |Vgs−Vth| also decreases, where Vgs is a gate-source voltage applied to the transistor device. Hence, the smaller quantity |Vgs−Vth| makes it more sensitive to changes in Vth due to temperature. On the other hand, propagation delay is also proportional to electron mobility, which decreases as temperature increases. Therefore, the overall effect of temperature inversion, whether speeding up or slowing down the propagation delay, will be determined by the dominate factor of the two. The voltage where temperature dependence reverses (or inverts) is often referred to as the crossover voltage, the zero-temperature coefficient (ZTC) voltage, or the inversion voltage. This possible reverse dependency of propagation delay on temperature raises a new concern in a multiple corners timing sign-off methodology.

Timing sign-off plays an important role in design flow, essentially serving as a last check before taping off for IC fabrication. Using STA tools to perform sign-off, a pre-characterized cell library is generated based, for example, on circuit simulation results using SPICE (Simulation Program with Integrated Circuit Emphasis), or the numerous variants thereof, including but not limited to, HSPICE® (a registered trademark of Synopsys, Inc.), PSpice® (a registered trademark of Cadence Design Systems, Inc.), IS_Spice, and Micro-Cap IV, under one or more PVT conditions. PVT refers to three primary elements that determine a cell's performance, namely, process (P), voltage (V), and temperature (T). The combination of P, V, and T is generally referred to as a PVT condition, and when one or more of the three variables P, V, or T is at a minimum or maximum prescribed value, it is generally referred to as a PVT corner. The P corner determines the electrical properties of the device, while the V and T corners are indicative of the operating environment under which the devices in the cell are characterized.

Timing sign-off has evolved from single nominal corner sign-off, to two corners PVT fast and slow corner sign-off, then to four corners PV fast and slow corner with hot and cold temperature sign-off. The purpose of a multiple corners timing sign-off methodology is to ensure that the extreme cases are checked during the analysis, which assumes that cell and/or path delays are fastest at a specified minimum temperature (best) corner and slowest at a specified maximum temperature (worst) corner. Before the ITD effect was discovered, all cells were assumed to have their switching behaviors slow down as temperature increased. Under such assumptions, designers did not need to be concerned with the relationship between delay and temperature. However, with the presence of the ITD effect, this assumption is no longer guaranteed because cells may operate faster at the highest specified temperature or even at some intermediate temperature. Moreover, the worst-case temperature may be different for different cells, loads and input signal slews, and for different paths, all of which further complicates the problem of trying to accurately predict circuit timing.

Cell and path delays may behave nonmonotonically as a function of temperature. Thus, worst case delay (minimum or maximum) may occur between prescribed temperature corners. In addition, even when minimum and maximum cell delays are observed at the temperature corners, implying that at any intermediate temperature, the cell delay is between the respective delays corresponding to the temperature corners, the path delay still may have minimum or maximum delay at an intermediate temperature.

FIG. 1 illustrates a non-linear relationship between delay and temperature for an exemplary circuit including two gates, namely, Gate A and Gate B. As apparent from the figure, Gate A has a first timing arc 102 associated therewith and Gate B has a second timing arc 104 associated therewith. While Gate A exhibits a delay which increases with increasing temperature, Gate B exhibits a delay which decreases with increasing temperature. Although both timing arcs 102, 104, when considered individually, are monotonic with minimum and maximum delay occurring at either the highest or lowest temperature, a signal path, $Path_{AB}$, in the circuit including a combination of the two gates, will exhibit a maximum delay at some intermediate temperature, as represented by non-monotonic timing arc 106.

By way of example only and without loss of generality, consider timing characterization for an illustrative cell library. For each cell, seven different output loading capacitances and seven different input ramp-times (slews) are simulated for several PVT corners. In each of three different combinations of PV corners, namely, best process/voltage, nominal process/voltage, and worst case process/voltage, timing characterization is preferably performed at each of three different temperatures of interest: −40, 25 and 120 degrees Celsius (° C.). It is to be understood that the invention is not limited to any specific temperatures at which timing characterization is performed. An exemplary TSMC 65 nm device model file may be used, although the invention is not limited to any particular IC process model. Output loading and input ramp-time settings are preferably the same as those found in a look-up table based cell library, so that a better estimate of temperature variation effects on the cell library can be obtained.

Figure 2:
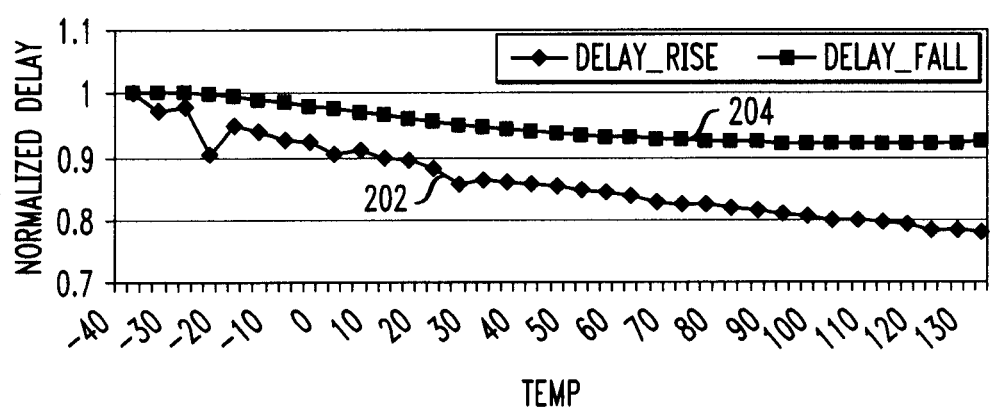
FIG. 2 graphically illustrates the impact of temperature inversion on an exemplary clock buffer cell which may be included in a standard cell library.

FIG. 2 graphically illustrates the impact of temperature inversion on an exemplary clock buffer cell which may be included in a standard cell library. As apparent from the figure, the fastest transition delay, for both rise time and fall time, occurs at the highest temperature; likewise, the slowest transition delay occurs at the lowest temperature. For waveform 202, which is indicative of a rising transition of an output of the buffer cell, the difference between two temperature extremes, for example, −40° C. and 130° C., is about 22 percent. For waveform 204, which is indicative of a falling transition of the output of the buffer cell, the difference between the two temperature extremes is about 8 percent. Thus, if we only look at this single cell with the specific output loading and input and try to estimate its fastest delay by setting the temperature at −40° C., the result may be off by up to about 22 percent for rising transitions and up to about 8 percent for falling transitions, respectively.

In general, cell delay is not necessarily linear. Moreover, cell delay need not even be a monotonic function of temperature T. Assume, for purposes of illustration, that current timing sign-off for each sign-off corner is performed to two temperatures, namely, $T=L_{min}$ and $T=T_{max}$, because of the impact of timing inversion on delay D(P) of each signal path P, where $T_{min}$ and $T_{max}$ are prescribed minimum and maximum temperatures of operation of the cell, respectively. It is assumed that either path delay $D(P)=D(P, T_{min})$ or $D(P)=D(P, T_{max})$ will be indicative of the minimum or maximum delay, respectively, for signal path P in the cell.

The above statement with regard to path delay in cell C holds true when the cell delay D(C, T) of cell C is a linear function of temperature T, such that:

$$D(C,T)=a(C)T+b(C),$$

where a and b are constants for cell C. Note that a<0 for cells exhibiting temperature inversion, at least for one or more ramp-time and/or load combinations.

As proof of the above statement, assume that path P in a given circuit comprises cells {1, 2, . . . , N}, where N is an integer greater than 1. Then path delay D(P, T) in the circuit may be determined in accordance with following expression:

$$D(P, T) = \sum_{C=1}^{N} D(C, T)$$
$$= \sum_{C=1}^{N} [a(C)T + b(C)]$$
$$= AT + B$$

where:

$$A = \sum_{C=1}^{N} a(C) = const$$

$$B = \sum_{C=1}^{N} b(C) = const$$

Thus, each signal path P in the circuit may experience temperature inversion (e.g., A<0) or may not experience temperature inversion (e.g., A>0) depending on the combination(s) of cells in the path and their respective ramp-times and/or loads.

As stated above, cell delay D(C,T) may be not a linear function of temperature T. Furthermore, cell delay may be nonmonotonic, such that the cell delay D(C, T) at some intermediate temperature $T_{int}$, between a prescribed minimum temperature $T_{min}$ and a prescribed maximum temperature $T_{max}$, may be greater or less than a delay $D(C,T_{min})$ of the cell C at the minimum temperature, or a delay $D(C,T_{max})$ of the cell at the maximum temperature. This implies that path delay D(P, T) in a circuit including one or more cells may also be nonmonotonic with respect to temperature, such that the path delay D(P, T) at some intermediate temperature $T_{int}$, between the prescribed minimum temperature $T_{min}$ and the prescribed maximum temperature $T_{max}$, may be greater or less than a delay $D(P,T_{min})$ of the path at the minimum temperature, or a delay $D(P,T_{max})$ of the path at the maximum temperature corresponding to the PVT corners for timing sign-off.

By way of example only, consider a small test circuit having a path P that includes two cells (e.g., simple buffers) C1 and C2. It is to be appreciated that the techniques of the invention are not limited to any specific number and/or type of cells. Using this simple illustrative test case, the impact of temperature inversion on minimum path delay, as may be used for hold violation check, can be observed. Exemplary delay functions corresponding to this test case are described with reference to FIG. 3.

Figure 3:
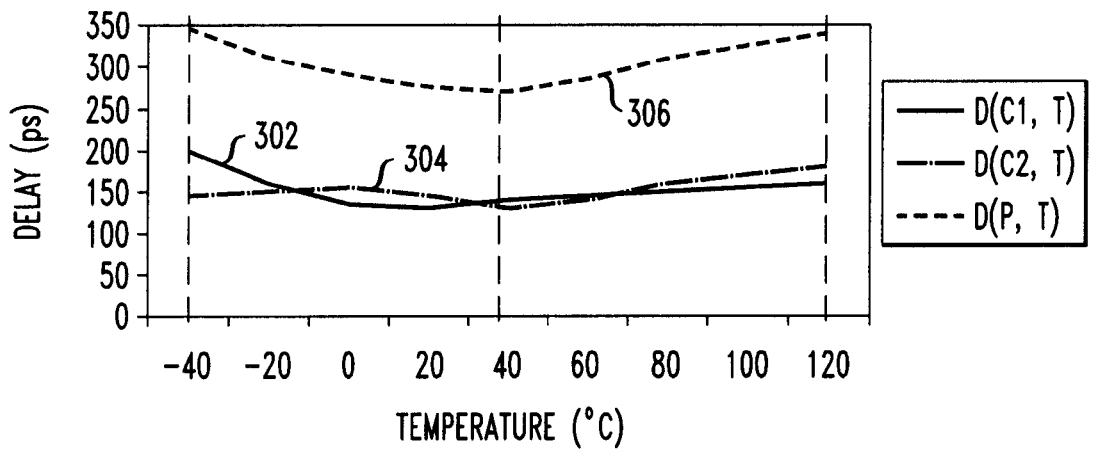
FIG. 3 graphically illustrates cell and path delays as a function of temperature for an exemplary circuit including at least two cells.

FIG. 3 graphically illustrates cell and path delays as a function of temperature for an exemplary circuit including at least two cells. The circuit may be, for example, a clock buffer cell included in a standard cell library. Waveform 302 represents the delay of a first cell, C1, in the circuit, waveform 304 represents the delay of a second cell, C2, in the circuit, and waveform 306 represents the delay of a signal path, P, through the two cells C1 and C2. The impact of temperature inversion on the exemplary clock buffer cell (and path) delays can be clearly observed.

Using traditional timing sign-off methodologies, after delay analysis at temperatures $T_{min}$ and $T_{max}$, minimum path delay in the circuit would be found at the minimum prescribed temperature $T_{min}$ (e.g., −40° C.) as D=D(P,$T_{min}$=−40° C.)=340 picoseconds (ps). Real minimum path delay, however, is observed at an intermediate temperature, namely, about 40° C., D(P,T=40° C.)=270 ps. This equates to a delay error of 70 ps, or −25.9 percent. This error can easily result in missing a hold-time violation. Likewise, maximum path delay would, using traditionally timing sign-off methodologies, be found at the maximum prescribed temperature $T_{max}$ (e.g., 120° C.) as D=D(P, $T_{max}$=120° C.)=335 ps. Real maximum path delay in this illustration, however, is observed at the minimum temperature, namely, −40° C., D(P,T=−40° C.)=340 ps. This equates to a delay error of about 5 ps, or 1.5 percent. This error may result in missing a setup time violation (or maximum path delay).

As apparent from the figure, when the minimum and maximum cell delay at an intermediate temperature is between the minimum/maximum delays at the prescribed temperature corners, path delay can have a real minimum or maximum value outside the delay extremes found at the temperature corners. Note, that minimum or maximum cell delays at an intermediate temperature may even be less or greater than minimum or maximum delays at the temperature corners.

The above illustration shows how conventional timing sign-off methodology using two temperature corners is inadequate for accurately predicting circuit timing behavior because it may be optimistic. More particularly, the two temperature corners timing analysis approach can no longer guarantee the prediction of best- and worst-case timing behavior of a circuit. Temperature inversion effects can undesirably impact cell and path delay analysis and prediction during the design phase, and may lead to device failure if not properly taken into account prior to manufacture.

In order to improve the accuracy of circuit timing analysis so as to beneficially minimize timing violations in a given circuit, timing sign-off and temperature optimization of logical paths preferably incorporates temperature inversion information relating to the circuit, according to aspects of the present invention.

Figure 4:
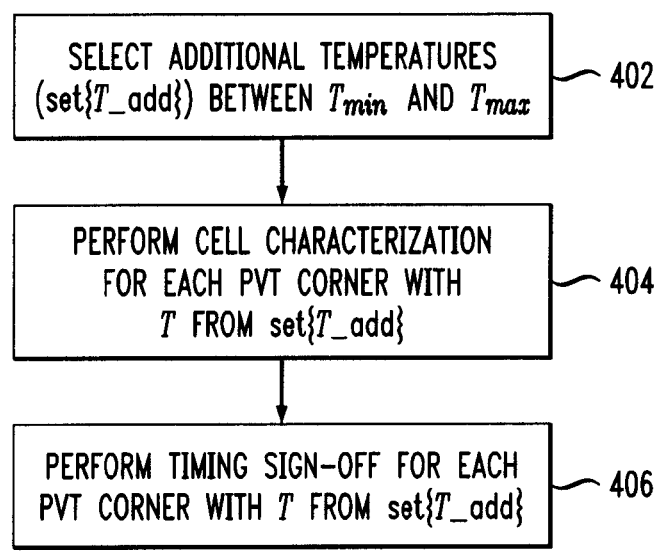
FIG. 4 is a flow diagram illustrating an exemplary method for improving the accuracy of circuit timing analysis, in accordance with one embodiment of the invention.

FIG. 4 illustrates an exemplary method 400 for improving the accuracy of circuit timing analysis, in accordance with one embodiment of the invention. Method 400 essentially increases the number of temperature points for each process and voltage (PV) corner used in evaluating circuit timing behavior, and timing sign-off is then performed at each of the PVT corners. Specifically, in step 402, a set of one or more additional temperatures, T_add, between prescribed minimum and maximum temperatures, $T_{min}$ and $T_{max}$, respectively, are selected. Cell timing characterization for each PVT corner is performed in step 404 at the temperatures in set{T_add} generated in step 402, as well as at the minimum and maximum temperatures $T_{min}$ and $T_{max}$. In step 406, timing sign-off is performed for each PVT corner using temperatures from set{$T_{add}$}.

Advantages of this approach are that the methodology itself is relatively simple, and that the methodology, an expansion of the traditional sign-off approach, can employ traditional sign-off tools essentially without modification. However, this approach is expensive in that it requires implementation of one or more additional characterizations to create more corners as well as requiring additional time to perform timing sign-off at all PVT corners. Additionally, there is a risk that some worst-case temperature will still be missed.

FIG. 5 illustrates an exemplary method 500 for improving the accuracy of circuit timing analysis, in accordance with another embodiment of the invention. Method 500 involves modifying the STA tools and enhancing cell library creation, making cell library delay characterization more conservative in handling temperature used for a given cell or cells. More particularly, rather than using the temperature of the current PVT corner as the temperature of the cell, the delay characterization preferably employs a temperature that produces maximum cell delay for setup-time analysis, and/or a temperature that produces minimum cell delay for hold-time analysis. To implement this methodology, an additional temperature characterization is performed for each cell.

Specifically, in step 502, for each cell in the cell library, a first temperature, T', is determined at which cell delay is minimum. In step 504, for each cell in the cell library, a second temperature, T", is determined at which cell delay is maximum. The minimum cell delay, $D_{min}$(T') and the maximum cell delay, $D_{max}$(T") are then saved in the cell library in step 506. The minimum and maximum cell delays $D_{min}$(T') and $D_{max}$(T") are preferably stored as tables, replacing the current delay tables associated with the cell that were generated using one fixed temperature T corresponding to the library PVT corner. The delay calculator will preferably use these new delay tables in the same manner as the previous delay tables which they replaced.

Method 500 includes advantages that it can employ a traditional timing sign-off methodology, that it may use less temperature corners compared to traditional approaches, and that it is inherently never optimistic, since worst-case delay is actually determined and used. Consequently, there is no risk that some worst-case temperature will be missed. However, as a trade-off for the above benefits, method 500 requires an additional cell characterization, requires modification (enhancement) of the delay calculator (it should use minimum or maximum delay table as needed), and is conservative in average timing analysis.

FIG. 6 illustrates an exemplary method 600 for improving the accuracy of circuit timing analysis, in accordance with another embodiment of the invention. Method 600 effectively adds a margin to the output of an STA tool so as to modify the STA results to take into account the effects of temperature on cell timing. More particularly, in step 602, temperature characterization is first performed for each cell in the library using traditional circuit simulation tools (e.g., HSPICE) and PVT corners. The delay values obtained from the characterization are then stored (e.g., in memory) in the cell library in step 604. An additional margin is then added to the stored delay values in step 606 during STA or statistical STA (SSTA) run time, for example, as a de-rating factor, to shift the STA or SSTA results. This margin, which takes into account temperature variation across the chip, and may incorporate other sources of OCV as well, preferably corrects possible errors in cell delay calculation due to a difference between timing sign-off temperature and real temperature, which may produce worse cell delay.

Advantages of method 600 may include, for example, the ability to employ traditional sign-off techniques and tools, simplicity, operation at traditional temperature corners, and controlled risk of device failure. However, method 600 requires the estimation of additional OCV margins and may result in pessimistic delay estimations in order to provide sufficient guarantees that no timing violations will occur.

Figure 7:
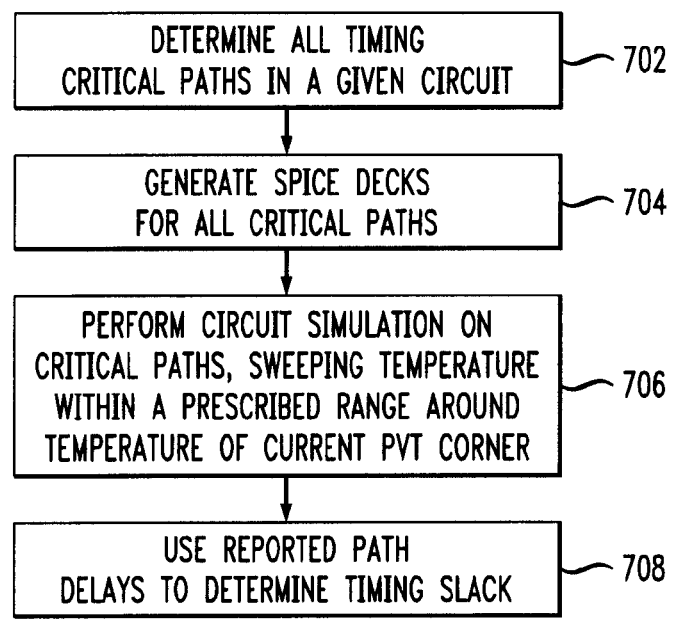
FIG. 7 is a flow diagram illustrating another exemplary method for improving the accuracy of circuit timing analysis, in accordance with an embodiment of the invention.

FIG. 7 illustrates another exemplary method 700 for improving the accuracy of circuit timing analysis, in accordance with an embodiment of the invention. Method 700, which comprises determining all critical paths in a given circuit and then performing a sweeping temperature analysis for these critical paths, provides a significant improvement in the accuracy of the timing analysis and is preferred when the number of timing critical paths is relatively small (e.g., on the order of thousands). A critical path, which may be identified using standard STA tools, PVT corners, and sign-off methodologies that will report all paths with small timing slack, can be defined as a path having a corresponding timing slack that is less than a prescribed threshold, such as, for example, about 100 ps (the greater the threshold value, the higher the safety margin but the higher the number of reported critical paths).

In step 702, all timing critical paths in the circuit are determined. There are many conventional techniques for determining timing critical paths in a circuit. For example, one way to identify the critical path(s) is simply to define a critical path as any signal path in a given design having a timing slack less than some prescribed threshold value, and then to find all such paths using an STA tool or alternative timing analysis methodology. For setup timing analysis, for example, these critical paths are usually the longest paths in the design (e.g., paths having a length greater than a prescribed threshold length). This is typically performed post-layout, since the respective lengths of all conductors in the circuit are readily available as an output of the IC layout tool (e.g., Graphic Data System (GDS) II stream format, etc.). In the case of a cell in a standard cell library, this information is typically available as part of the characterization data associated with each cell. Once the critical paths have been identified, SPICE decks, or alternative circuit simulation commands and/or functional parameters, are generated for each of the critical paths in step 704.

Circuit simulation is then performed in step 706 on all critical paths using the simulation commands generated in step 704. A circuit simulation program such as, for example, HSPICE or PSpice, can be used to obtain timing characterization data, particularly, path delays, corresponding to the critical paths. In an illustrative embodiment, a Quartus® (a registered trademark of Altera Corporation) II TimeQuest timing analyzer may be used to perform the timing analysis of a given design. The Quartus II TimeQuest timing analyzer is operative to analyze the timing paths in the design, calculate the propagation delay along each path, check for timing constraint violations, and report timing results. It is to be understood that the invention is not limited to use with any specific circuit simulation program and/or techniques for predicting path delays in the design. Simulation of the critical paths preferably comprises sweeping the temperature within a prescribed range (e.g., ±20° C.) of each PVT corner temperature. In step 708, the path delay and/or alternative timing information relating to the critical paths, as reported by the simulation program, is used to determine timing slack (e.g., margins).

Advantages of method 700 may include, for example, the ability to employ traditional sign-off techniques and tools, accuracy, and the requirement of only a small run-time overhead, assuming the number of critical paths is relatively small. However, this overhead can become significant when the number of critical paths to be evaluated by method 700 is large (e.g., more than about 10,000 paths, which is possible in the case of hold-time analysis).

Figure 8:
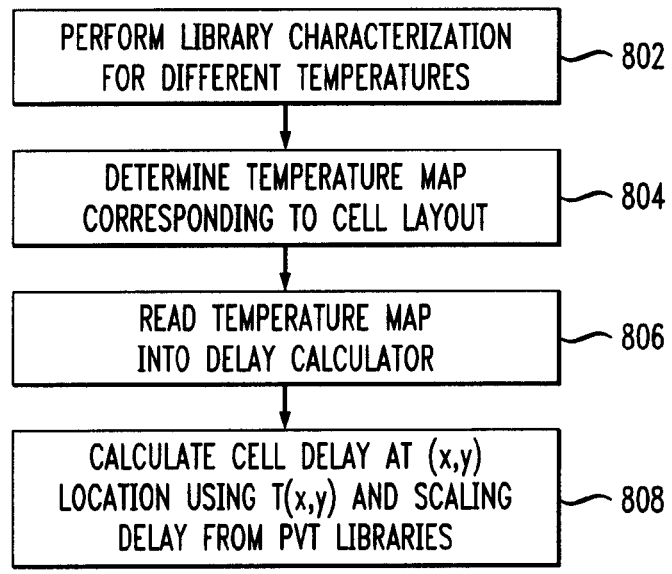
FIG. 8 is a flow diagram illustrating an exemplary method for improving the accuracy of circuit timing analysis, in accordance with still another embodiment of the invention.

FIG. 8 illustrates an exemplary method 800 for improving the accuracy of circuit timing analysis, in accordance with another embodiment of the invention. Method 800, which adds a cell delay calculation capability that is temperature dependent for each particular instance of a given cell, provides a significant improvement in the accuracy of the timing analysis and is preferred when the number of timing critical paths is relatively large since this methodology requires significantly less run-time overhead compared to alternative techniques described herein.

Method 800 is operative to perform cell library characterization for multiple prescribed temperatures in step 802. A traditional delay characterization may be performed not only for prescribed minimum and maximum temperatures, but for several intermediate temperatures, for example, in intervals of 20° C. (e.g., −40° C., −20° C., 0° C., 20° C., . . . , 120° C.). Each of these temperatures will be associated with some PVT libraries. In step 804, a temperature map is generated corresponding to a physical layout for the design. This may be accomplished, for example, by estimating the temperature for each point on the chip and then generating a temperature gradient map for the chip. Tools for performing such IC thermal estimation and analysis are commercially available (e.g., HeatWave™, a trademark of Gradient Design Automation Inc.). The temperature map generated in step 804 is then read into a delay calculator in step 806. Thus, the delay calculator will have access to the temperature map and should receive, as input data, the specific temperature T(x,y) for each cell that is located in position (x,y).

In step 808, the delay calculator preferably determines cell delay at position (x,y) using temperature T(x,y) from the temperature map. This may be accomplished, in one embodiment, by determining which two characterized temperatures, T1 and T2, from the library of PVT corners, the temperature T(x,y) falls between. Then, cell delay corresponding to T(x,y) may be calculated by interpolating between a first delay, D1, corresponding to the first PVT corner temperature T1 from the cell library, and a second delay, D2, corresponding to the second PVT corner temperature T2 (also known as delay scaling). The interpolation may be done, for example, by scaling the delays D1 and D2 from the two corresponding PVT libraries. The cell delay calculation may then be incorporated into a timing report for the cell by modifying at least one parameter of the timing characterization for the cell, although alternative techniques for incorporating the cell delay calculation results into the timing report are similarly contemplated.

Advantages of method 800 include, for example, the ability to employ traditional sign-off techniques and tools, the use of traditional temperature corners in the cell library, high accuracy, and the requirement of only a small run-time overhead. A trade-off for these advantages, however, includes the requirement of additional PVT corners characterization, modification to the delay calculator, and the need to calculate a temperature map for the given cell layout.

It is to be understood that, in accordance with other embodiments of the invention, at least a portion of one or more of the methods 400, 500, 600, 700 and 800, for improving the accuracy of circuit timing analysis, as shown in FIGS. 4 through 8, respectively, may be combined to achieve a desired trade-off between features and cost. As a function of the methodologies described herein, one or more parameters of the circuit are preferably analyzed and/or modified so as to optimize a performance and/or reliability of the circuit, at least in terms of reducing a sensitivity of the circuit to the effects of temperature inversion. More particularly, results of the static timing analysis performed on the circuit may be used to determine whether or not the circuit will operate within prescribed parameters corresponding to the circuit.

Benefits of the present invention include the ability to more accurately predict circuit performance over variations in temperature, thereby saving time and cost in a design process of the circuit.

Figure 9:
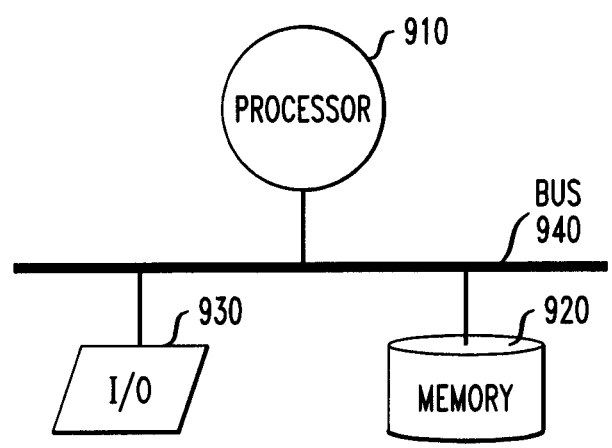
FIG. 9 is block diagram depicting an exemplary system in which techniques of the present invention may be implemented, in accordance with an embodiment of the invention.

One or more embodiments of the invention can make use of software running on a general purpose computer or workstation. With reference to FIG. 9, such an implementation might employ, for example, a processor 910, a memory 920, and an input/output (I/O) interface 930 which may include, for example, a display and a keyboard (not explicitly shown). The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 910, memory 920, and I/O interface 930 can be interconnected, for example, via bus 940 as part of a data processing unit 900. Suitable interconnections, for example via bus 940, can also be provided to a network interface (not explicitly shown), such as a network card, which can be provided to interface with a computer network, and to a media interface, such as a diskette or CD-ROM drive, which can be provided to interface with media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium providing program code for use by or in connection with a computer or any instruction execution system. For the purposes of this description, a computer usable or computer readable medium can be any apparatus for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory (for example memory 920), magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

An electronic system, preferably a data processing system, suitable for storing and/or executing program code will include at least one processor 910 coupled directly or indirectly to memory elements 920 through system bus 940. The memory elements can include local memory employed during actual execution of the program code, bulk storage, and cache memories which provide temporary storage of at least some program code in order to reduce the number of times code must be retrieved from bulk storage during execution.

Network adapters such as network interface (not explicitly shown) may also be coupled to the system to enable the data processing system to become coupled to other data processing systems or remote printers or storage devices through intervening private or public networks. Modems, cable modem and Ethernet cards are just a few of the currently available types of network adapters.

In any case, it should be understood that the methodology illustrated herein may be implemented in various forms of hardware, software, or combinations thereof, for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

At least a portion of the circuits and methodologies of the present invention may be implemented in one or more integrated circuits. In forming integrated circuits, die are typically fabricated in a repeated pattern on a surface of a semiconductor wafer. Each of the die includes a device described herein, and may include other structures or circuits. Individual die are cut or diced from the wafer, then packaged as integrated circuits. One skilled in the art would know how to dice wafers and package die to produce integrated circuits. Integrated circuits so manufactured are considered part of this invention.

An integrated circuit in accordance with the present invention can be employed in any application and/or electronic system which utilizes memory, embedded or otherwise. Suitable systems for implementing techniques of the invention may include, but are not limited to, personal computers, communication networks, electronic instruments (e.g., automated test equipment (ATE)), interface networks, etc. Systems incorporating such integrated circuits are considered part of this invention. Given the teachings of the invention provided herein, one of ordinary skill in the art will be able to contemplate other implementations and applications of the techniques of the invention.

Although illustrative embodiments of the present invention have been described herein with reference to the accompanying drawings, it is to be understood that the invention is not limited to those precise embodiments, and that various other changes and modifications may be made therein by one skilled in the art without departing from the scope of the appended claims.

What is claimed is:

1. A computer-implemented method for increasing an accuracy of timing characterization of a circuit including at least one cell in a cell library, the method comprising the steps of:
    for each cell in the circuit, performing, by a processor, cell library timing characterization for at least prescribed first and second temperatures, the first and second temperatures corresponding to at least first and second process, voltage and temperature (PVT) corners in the cell library;
    calculating, by a processor, a cell delay for each cell in the circuit, the cell delay calculation being a function of temperature for each instance of the at least one cell; and
    adding a margin to the cell delay for each cell in the circuit when the temperature is a temperature other than the at least one of the first and second temperatures, the cell library timing characterization being modified as a function of the margin corresponding to each cell in the circuit to take into account effects of temperature inversion and thereby increase the accuracy of timing characterization of the circuit.

2. The method of claim 1, wherein the step of adding a margin to the cell delay for each cell in the circuit is performed during run-time of the cell library timing characterization.

3. The method of claim 1, wherein the margin added to the cell delay for each cell in the circuit comprises a de-rating factor which incorporates effects of temperature on cell timing of the cell.

4. The method of claim 1, wherein the step of calculating the cell delay comprises:
   determining a temperature map corresponding to a physical layout of the at least one cell in the circuit; and
   determining the cell delay of the at least one cell as a function of a temperature at a physical location of the at least one cell.

5. The method of claim 1, further comprising incorporating the cell delay calculation into the timing characterization for the at least one cell in the circuit to take into account effects of temperature inversion and thereby increase the accuracy of the timing characterization.

6. A computer-implemented method for increasing an accuracy of timing characterization of a circuit including at least one cell in a cell library, the method comprising the steps of:
   for each cell in the circuit, performing, by a processor, cell library timing characterization for at least prescribed first and second temperatures, the first and second temperatures corresponding to at least first and second process, voltage and temperature (PVT) corners in the cell library;
   calculating, by a processor, a cell delay for each cell in the circuit, the cell delay calculation being a function of temperature for each instance of the at least one cell; and
   adding a margin to the cell delay for each cell in the circuit, the cell library timing characterization being modified as a function of the margin corresponding to each cell in the circuit to take into account effects of temperature inversion and thereby increase the accuracy of timing characterization of the circuit;
   wherein the step of calculating the cell delay comprises:
   determining a temperature map corresponding to a physical layout of the at least one cell in the circuit;
   determining the cell delay of the at least one cell as a function of a temperature at a physical location of the at least one cell;
   determining a first delay of the at least one cell at the first prescribed temperature;
   determining a second delay of the at least one cell at the second prescribed temperature; and
   interpolating between the first and second delays to determine the cell delay of the at least one cell at the temperature at the physical location of the cell.

7. The method of claim 6, wherein the step of interpolating comprises scaling the first and second delays corresponding to the first and second PVT corners, respectively, in the cell library.

8. A timing characterization system for increasing an accuracy of timing characterization of a circuit including at least one cell in a cell library, the system comprising:
   a memory device storing a plurality of instructions embodying the system and an application; and
   a processor configured to receive the application and execute the plurality of instructions to perform a method comprising:
   for each cell in the circuit, performing cell library timing characterization for at least prescribed first and second temperatures, the first and second temperatures corresponding to at least first and second process, voltage and temperature (PVT) corners in the cell library;
   calculating a cell delay for each cell in the circuit, the cell delay calculation being a function of temperature for each instance of the at least one cell; and
   adding a margin to the cell delay for each cell in the circuit, the cell library timing characterization being modified as a function of the margin corresponding to each cell in the circuit to take into account effects of temperature inversion and thereby increase the accuracy of timing characterization of the circuit;
   wherein the step of calculating the cell delay comprises:
   determining a temperature map corresponding to a physical layout of the at least one cell in the circuit;
   determining the cell delay of the at least one cell as a function of a temperature at a physical location of the at least one cell;
   determining a first delay of the at least one cell at the first prescribed temperature;
   determining a second delay of the at least one cell at the second prescribed temperature; and
   interpolating between the first and second delays to determine the cell delay of the at least one cell at the temperature at the physical location of the cell.

* * * * *